(12) United States Patent
Imase et al.

(10) Patent No.: US 8,460,146 B2
(45) Date of Patent: Jun. 11, 2013

(54) ROLLER TYPE TRANSMISSION DEVICE

(75) Inventors: Kenji Imase, Aichi (JP); Sukejiro Nagata, Aichi (JP)

(73) Assignee: Kamoseiko Kabushiki Kaisha, Aichi (JP)

( * ) Notice: Subject to any disclaimer, the term of this patent is extended or adjusted under 35 U.S.C. 154(b) by 129 days.

(21) Appl. No.: 13/116,536

(22) Filed: May 26, 2011

(65) Prior Publication Data

US 2011/0319218 A1 Dec. 29, 2011

(30) Foreign Application Priority Data

Jun. 25, 2010 (JP) .................................. 2010-144947
Mar. 31, 2011 (JP) .................................. 2011-079703

(51) Int. Cl.
*F16H 1/32* (2006.01)

(52) U.S. Cl.
USPC .......................................................... 475/168

(58) Field of Classification Search
None
See application file for complete search history.

(56) References Cited

U.S. PATENT DOCUMENTS

| 2008/0139357 A1 | 6/2008 | Fujimoto |
| 2010/0058884 A1 | 3/2010 | Ackerman |
| 2011/0319217 A1* | 12/2011 | Imase et al. .................. 475/168 |

FOREIGN PATENT DOCUMENTS

| DE | 197 22 399 | 12/1998 |
| EP | 1 584 541 | 10/2005 |
| EP | 1 712 814 | 10/2006 |
| JP | 1-169154 | 7/1989 |
| JP | 4-282047 | 10/1992 |
| JP | 2001-132803 A | 5/2001 |
| JP | 2006-300338 | 11/2006 |
| JP | 2006-329431 | 12/2006 |

OTHER PUBLICATIONS

Extended European Search Report from corresponding application No. 11166412.4, dated Aug. 10, 2011.
European Search Report for Application No. 10 25 1532, May 18, 2011.
Office Action dated Mar. 28, 2013 from the Korean Patent Office in counterpart Korean application 10-2011-0059607.

* cited by examiner

*Primary Examiner* — Dirk Wright
(74) *Attorney, Agent, or Firm* — Morgan, Lewis & Bockius LLP

(57) ABSTRACT

In a roller type transmission device 1, an array 11 of transmission pin rollers is press fit circularly into an inner side surface 10*a* of a stationary ring 10, and an array 18 of controllable pin rollers is press fit circularly into an inner side surface 13*c* of a rotational ring 13. To pin rollers 11*a*, 18*a*, employed are high precision cylindrical rollers or needle rollers which are usually used for a roller bearing or the like. Such is the structure that the array 11 of transmission pin rollers and the array 18 of controllable pin rollers work as inner teeth to make a backlash phenomenon minimum, rendering a pitch distance precise between the pin rollers, maintaining a uniform tooth profile with a high precision, equalizing a surface roughness and improving a meshing precision between the pin rollers 11*a*, 18*a* and the teeth 7*a*, 8*a*.

12 Claims, 12 Drawing Sheets

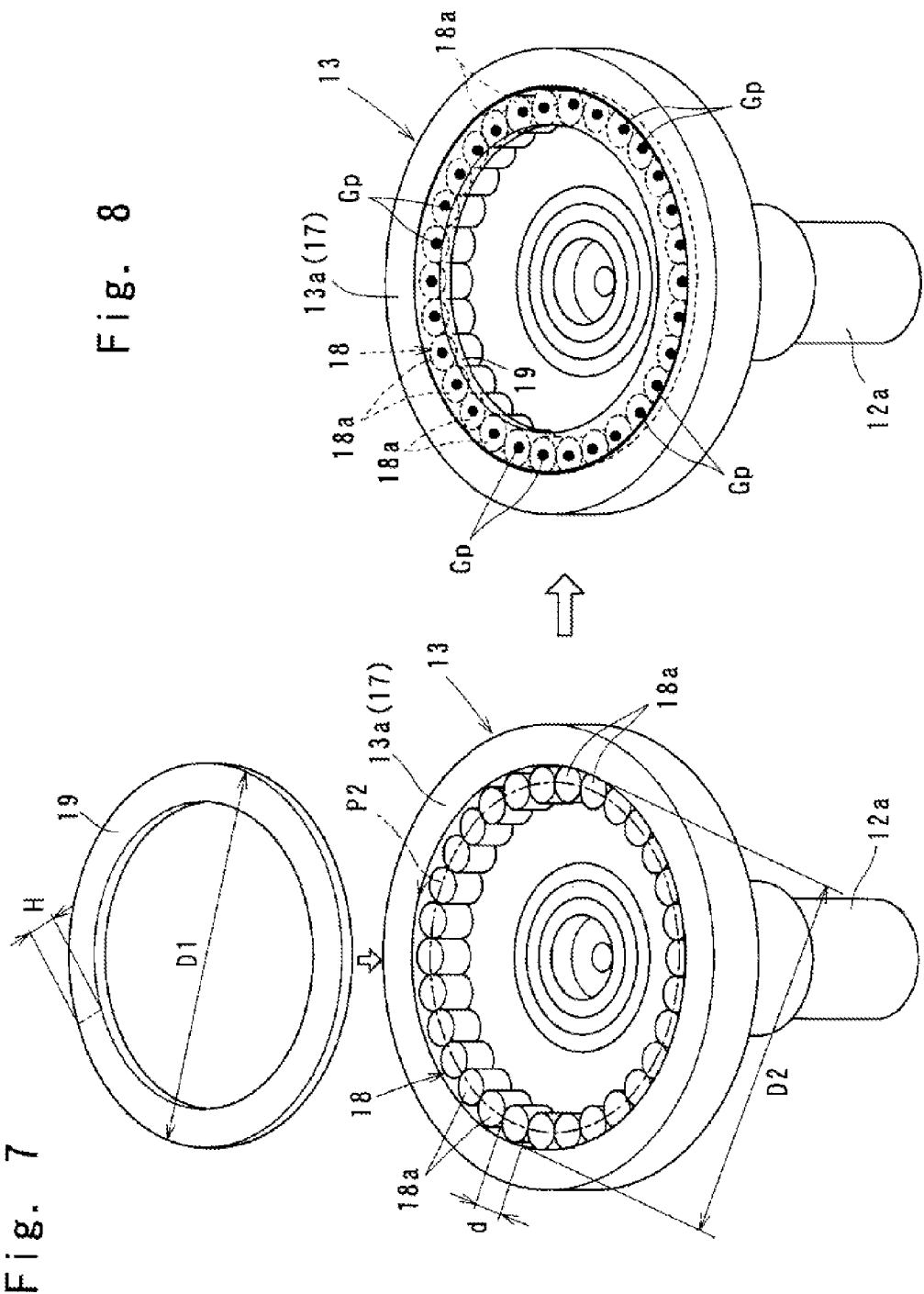

ROLLER TYPE TRANSMISSION DEVICE

The present invention is filed claiming priorities based on Japanese Patent Application Nos. 2010-144947 (filed on Jun. 25, 2010) and 2011-79703 (filed on Mar. 31, 2011).

BACKGROUND OF THE INVENTION

1. Field of the Invention

The present invention relates to a roller type transmission device in which some of pin rollers always mesh with the respective teeth of a ring gear, and particularly concerns a roller type transmission device which is improved to achieve a high reduction ratio with a high precision.

2. Description of Related Art

As a general differential speed reducer device, a roller-type speed reducer device has been introduced by Japanese Laid-open Patent Application Nos. 2006-300338, 2006-329431 and 01-169154 (referred simply to as references hereinafter).

The speed reducer device of these references has been employed to a canti-lever arm of an industrialized robot in order to reduce the speed from an electric motor powered with a high revolution but a low torque.

The speed reducer device has an outer gear ring and an inner gear ring, a central portion of which has an eccentric shaft as an output ring. The outer gear ring has an outer side which has a multitude of wavy teeth circumferentially profiled in a cycloidal fashion. The inner gear ring is placed to surround the outer gear ring, and has an inner side surface which has a multitude of columnar pins circumferentially placed at regular intervals. The outer gear ring corresponds its outer teeth to the pins of the inner gear ring, and determines the number of the outer teeth to be less than the number of the pins by the difference of one.

Upon operating the speed reducer device, the outer teeth rides over the pins to rotationally move the inner gear ring by a pitch distance of the pins. Since the outer teeth rides over one pin when the eccentric shaft rotates by one single turn, the speed reduction ratio is expressed by an inverse number of the outer teeth. When the number of the outer teeth is counted as 40, the speed reduction ratio is calculated as 1/40.

In each of the above references, the inner gear ring has the inner side surface which forms a multitude of grooves (U-shaped in cross section) circumferentially arranged in parallel at regular intervals. Because the pins are presumably press fit into the respective grooves to embed the pins into the inner side surface of the inner gear ring, it becomes necessary to precisely arrange each of the grooves at equal distance, width and depth while keeping an appropriate straightness of the grooves, thereby requiring microadjustment processes including such as, for example, a grinding procedure. The neighboring grooves are required to keep a little distance therebetween, which makes it difficult to reduce the inner gear ring in a diametrical dimension so as to defy to render the whole structure compact.

In order to take out only the rotational movement from the compound movement consisting of the rotational movement and the revolving movement, an adjustment mechanism is provided which forms an adjustment plate defined on the inner gear ring to have a plurality of openings arranged along a certain pitch circle on the adjustment plate. The adjustment plate has pins provided on the outer gear ring in registration with the openings. However, the mechanical principles has been studied to develop a simple adjustment mechanism without using the conventional adjustment plate and pins. This is because the conventional adjustment mechanism increases the number of the working processes upon assembling the adjustment mechanism, thus making it difficult to reduce the size of the adjustment plate so as to defy to render the whole structure compact.

Therefore, the present invention has been made with the above drawbacks in mind, it is a main object of the invention to provide a roller type transmission device which is capable of minimizing a backlash phenomenon, rendering a pitch distance precise between the pin rollers, maintaining a uniform tooth profile with a high precision, equalizing a surface roughness and improving a meshing precision between meshing portions, and reducing the number of assembly processes to reduce the manufacturing cost conducive to mass production.

SUMMARY OF THE INVENTION

According to the present invention, there is provided a roller type transmission device in which a housing is provided to rotatably accommodate a shaft which has an eccentric shaft portion. A stationary ring has a predetermined width, and is provided within the housing in concentric relationship with the shaft. A rotational body is fixedly placed within the housing in concentric relationship with the shaft, and having an open-ended portion which fixedly places a controllable ring as a rotational ring in concentric relationship with the stationary ring. An array of transmission pin rollers has a predetermined number of pin rollers which are press fit into the stationary ring along a certain basic circle to be in line contact with an inner side surface of the stationary ring with the abutting pin rollers pressure exerted in line contact with each other.

An array of controllable pin rollers has a predetermined number of pin rollers which are press fit into the rotational ring along a certain basic circle to be in line contact with an inner side surface of the rotational ring with the abutting pin rollers pressure exerted circularly in line contact with each other. A transmission ring body rotatably is secured to the eccentric shaft portion within the stationary ring and the rotational ring so as to eccentrically rotate in combination with a rotational movement of the shaft. A transmission ring gear is provided to have outer teeth circumferentially formed continuously at one peripheral side of the transmission ring body with the outer teeth profiled along a trochoidal curve, some of the outer teeth always engaging with a plurality of the pin rollers of the transmission pin rollers. A controllable ring gear is provided to have outer teeth circumferentially formed continuously at the other peripheral side of the transmission ring body with the outer teeth profiled along a circular of arc, some of the outer teeth always engaging with a plurality of the pin rollers of the controllable pin rollers. An arced diameter of the outer teeth of the controllable ring gear is equal to an outer diameter of the pin rollers of the array of controllable pin rollers plus a two-fold quantity of an eccentricity of the eccentric shaft portion, and making an integral difference in number between number of the pin rollers of the array of transmission pin rollers and number of the teeth of the transmission ring gear.

Such is the above structure that the array of transmission pin rollers is press fit to be circularly arranged along the inner side surface of the stationary ring, and the array of the controllable pin rollers is press fit to be circularly arranged along the inner side surface of the rotational ring. To the pin rollers, employed are high precision cylindrical rollers or needle rollers which are usually used for a roller bearing or the like. The array of transmission pin rollers and the array of controllable pin rollers work as outer teeth to make a backlash phenomenon minimum, achieving a precise pitch distance between the pin rollers, maintaining a uniform tooth profile with a high precision, equalizing a surface roughness and improving a meshing precision between meshing portions for realizing a smooth and precise speed reduction movement.

In order to assemble the array of transmission pin rollers and the array of controllable pin rollers, it is sufficient to press fit the pin rollers circularly along the inner side surfaces of the stationary ring and the rotational ring. This reduces the number of assembly processes and makes the whole structure compact with the pin rollers closely aligned circularly. Since the pin rollers are generally inexpensive, it becomes possible to render the roller type transmission device advantageous in cost and conducive to mass production with the simplified assembly procedures.

Since the transmission ring gear always engages some of its outer teeth with the plurality of the pin rollers of the transmission pin rollers, while the controllable ring gear always engages some of its outer teeth with the plurality of the pin rollers of the controllable pin rollers, it becomes possible to transmit the rotational movement from the transmission ring gear to the controllable ring gear at the least amount of friction with a high torque (high torque transmission).

By employing a bearing steel to the pin rollers, it becomes possible to provide the transmission pin rollers and the controllable pin rollers with a high mechanical strength.

Since the arced diameter of the outer teeth of the controllable ring gear is determined to be equal to the outer diameter of the pin rollers of the array of controllable pin rollers plus the two-fold quantity of the eccentricity of the eccentric shaft portion, by determining the dimensional relationship as (D=d+2e), it becomes possible to constitute an adjustment mechanism which takes out only the rotational movement from the compound movement consisting of the rotational movement and the revolving movement. Where (D) is the arced diameter of the outer teeth of the controllable ring gear, (d) is a diameter of the pin rollers, and (e) is the eccentricity of the eccentric shaft portion.

This makes it possible to contribute to make the whole structure compact with the simplified adjustment mechanism in comparison with the prior structure in which the adjustment plate and the pins form the counterpart adjustment mechanism.

According to other aspect of the present invention, the controllable ring gear is provided at the other peripheral side of the transmission ring body. Into the inner side surface of the controllable ring gear, the array of the controllable pin rollers are press fit in pressure exerting relationship with each other. The rotational body has a rotational ring, an outer periphery side of which has outer teeth circumferentially formed continuously. The controllable ring gear has some of its outer teeth always engaged with the respective pin rollers of the controllable pin rollers.

In the roller type transmission device in which the controllable ring is provided on the other periphery side of the transmission ring body, and the controllable ring gear is provided on the side of the rotational body, the same advantages as obtained above are achieved.

According to other aspect of the present invention, the transmission ring gear is provided at an outer periphery of the controllable ring so that the stationary ring is provided at an inner side surface of the housing to be located around the transmission ring gear in concentric relationship with the rotational ring. This makes it possible to place the stationary ring, the array of transmission pin rollers, the transmission ring gear, the controllable ring, the array of controllable pin rollers and the controllable ring gear in concentrically overlapping relationship with each other. This reduces the width of the above component members, thereby axially decreasing the whole structure to make the roller type transmission device compact.

According to other aspect of the present invention, an annular retainer is secured to each end surface of the array of controllable pin rollers, and another annular retainer is secured to each end surface of the array of transmission pin rollers by means of welding procedure.

With the annular retainer provided as above, it is possible to securely maintain the array of controllable pin rollers and the array of transmission pin rollers in a circular fashion.

According to other aspect of the present invention, the controllable ring and the array of controllable pin rollers are integrally formed each other, and the stationary ring and the array of transmission pin rollers are integrally formed each other. This makes it possible to readily profile the arced teeth from the controllable pin rollers and the transmission pin rollers.

According to other aspect of the present invention, the controllable ring and the array of controllable pin rollers are integrally formed each other with the use of a sintering alloy. The stationary ring and the array of transmission pin rollers are also integrally formed each other with the use of a sintering alloy.

With the use of the sintering alloy as an integrally forming material, it becomes possible to render the controllable ring and the stationary ring dimensionally precise with relatively easy procedures.

According to other aspect of the present invention, the controllable ring and the array of controllable pin rollers are integrally formed each other with the use of a synthetic material. The stationary ring and the array of transmission pin rollers are also integrally formed each other with the use of a synthetic material.

With the use of the synthetic material as an integrally forming matter, it becomes possible to make the stationary ring and the controllable ring lightweight and durable when applied to a canti-lever arm of an industrialized robot.

According to other aspect of the present invention, the roller type transmission device has an entire length which measures 15-40 mm in an axial direction, and having an outer diameter which measures 12-25 mm in a diametrical direction. The roller type transmission device is miniaturized to such an extent as to be adaptable to a limited region such as, for example, a robotized brachiation.

According to other aspect of the present invention, an adjustment mechanism provided between the other peripheral side of the transmission ring body and an open end of the rotational ring in order to take out only the rotational movement from the eccentric rotation of the transmission ring body to transmit the rotational movement to the rotational ring when operated.

The adjustment mechanism makes it possible to take out only the rotational movement from the transmission ring body in order to transmit the rotational movement to the rotational ring.

According to other aspect of the present invention, the adjustment mechanism has a plurality of circular cavities provided on one of an outer peripheral side of the transmission ring body and an open end side of the rotational ring along a predetermined circle. Pins are provided on the other of the outer peripheral side of the transmission ring body and an open end side of the rotational ring. A diametrical dimension of the circular cavity is equal to a two-fold of an eccentricity of the eccentric shaft portion plus a diametrical dimension of the pin, so that the pins come in sliding contact with circumferential wall surfaces of the cavities when operated.

With the pins provided on the transmission ring body and the cavities on the rotational ring, it becomes possible to readily manufacture and assemble the adjustment mechanism so as to make its product cost-effective.

According to other aspect of the present invention, the adjustment mechanism forms Oldham's shaft coupling.

In the Oldham's shaft coupling, an adjustment plate is provided between an outer peripheral side of the transmission ring body and an open end side of the rotational ring. One side surface of the adjustment plate has a first radial blade and the other side surface of the adjustment plate has a second radial blade in crossing relationship with the first radial blade.

A first streak of radial groove is provided on the outer peripheral side of the transmission ring body to slidably receive the first radial blade. A second streak of radial groove is provided on an open end side of the rotational ring to slidably receive the second radial blade.

With the Oldham's shaft coupling employed as the adjustment mechanism, it becomes possible to make the adjustment mechanism structurally simple and advantageous in cost since the adjustment mechanism is readily available as existent ones.

BRIEF DESCRIPTION OF THE DRAWINGS

A preferred form of the present invention is illustrated in the accompanying drawings in which:

FIG. 7 is an exploded perspective view of an annular retainer and the array of controllable pin rollers within the rotational ring according to a second embodiment of the invention;

FIG. 8 is a perspective view of the annular retainer welded to the array of controllable pin rollers within the rotational ring;

DETAILED DESCRIPTION OF PREFERRED EMBODIMENTS

Figure 1:
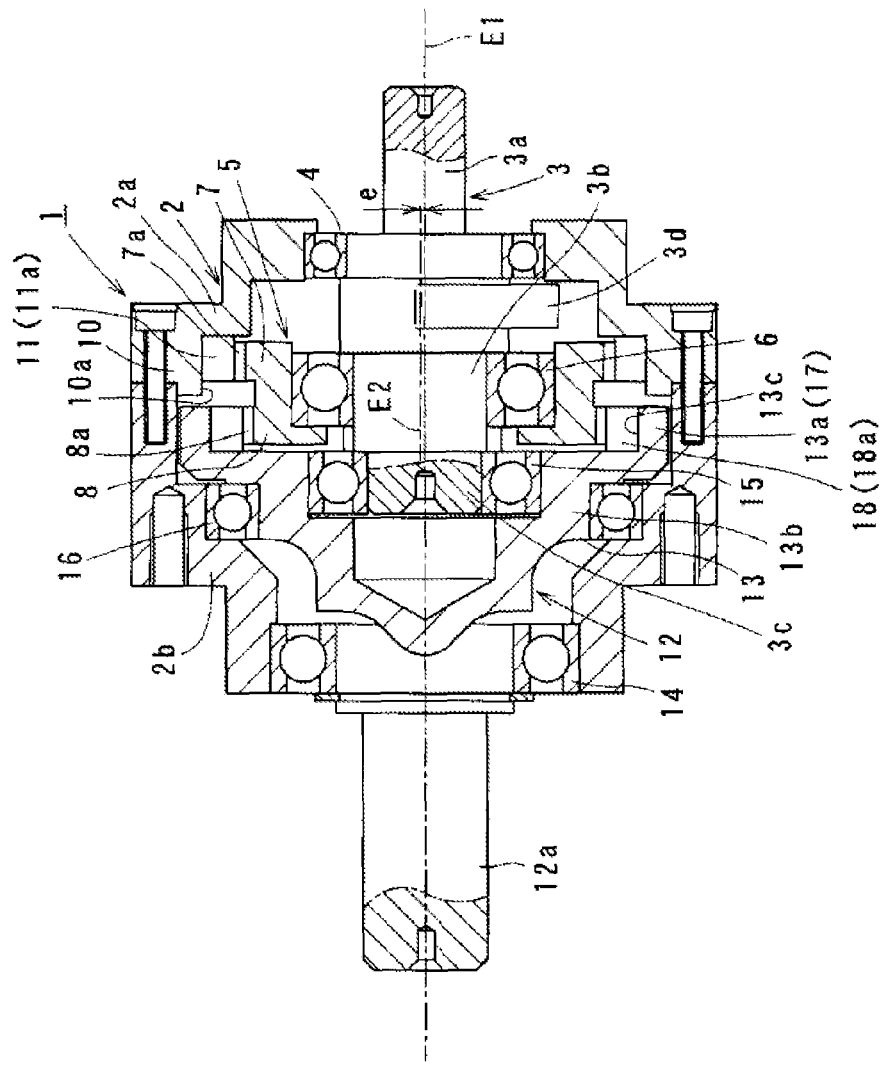
FIG. 1 is a longitudinal cross sectional view of a roller type transmission device according to a first embodiment of the invention.

In the following description of the depicted embodiments, the same reference numerals are used for features of the same type.

Referring to FIGS. 1 through 6 which show a roller type transmission device 1 and its related structures according to a first embodiment of the invention. As shown in FIG. 1, a cylindrical housing 2 has a first housing portion 2a and a second housing portion 2b which are concentrically connected together in abutting relationship with each other. A rotational shaft 3 is concentrically provided within the housing 2 in an axial direction.

The shaft 3 is rotatably supported at an open-ended portion of the first housing portion 2 by means of a ball bearing 4. One end of the shaft 3 has a diameter-reduced input shaft portion 3a, a middle section of the shaft 3 forms an eccentric shaft portion 3b, and the other end of the shaft 3 defines a diameter-increased support portion 3c. Between the input shaft portion 3a and the eccentric shaft portion 3b, the shaft 3 has a weight portion 3d integrally provided as a balancer in abutting relationship with the ball bearing 4.

The eccentric shaft portion 3b has an axial center (E2) to have an eccentricity (e) which corresponds to an off-center from an axial center (E1) of the shaft 3 so as to eccentrically rotate in combination with the rotational movement of the shaft 3. Within the housing 2, an annular transmission ring body 5 is rotatably supported at the eccentric shaft portion 3b by means of a ball bearing 6.

At one side of an outer periphery of the transmission ring body 5, provided is a transmission ring gear 7, an outer surface of which has outer teeth 7a profiled along a trochoidal curve continuously in a circumferential direction to be shaped like a holly tree leaf as a whole.

At the other side of the outer periphery of the transmission ring body 5, provided is a controllable ring gear 8, an outer surface of which has outer teeth 8a profiled along a circle of arc continuously in a circumferential direction.

By way of illustration, the transmission ring gear 7 has the outer teeth 7a counted as 30 in total, the number of which is the same as the outer teeth 8a of the controllable ring gear 8.

Around the transmission ring gear 7, concentrically provided is a stationary ring 10, an inner side surface 10a of which has an array 11 of transmission pin rollers arranged in a circular fashion. This locates the transmission ring gear 7 to be off-center from the stationary ring 10 by an amount of the eccentricity (e). The stationary ring 10 forms a part of the first housing portion 2a, and having the inner side surface 10a as an inner side wall of a predetermined length and breadth.

Figure 2:
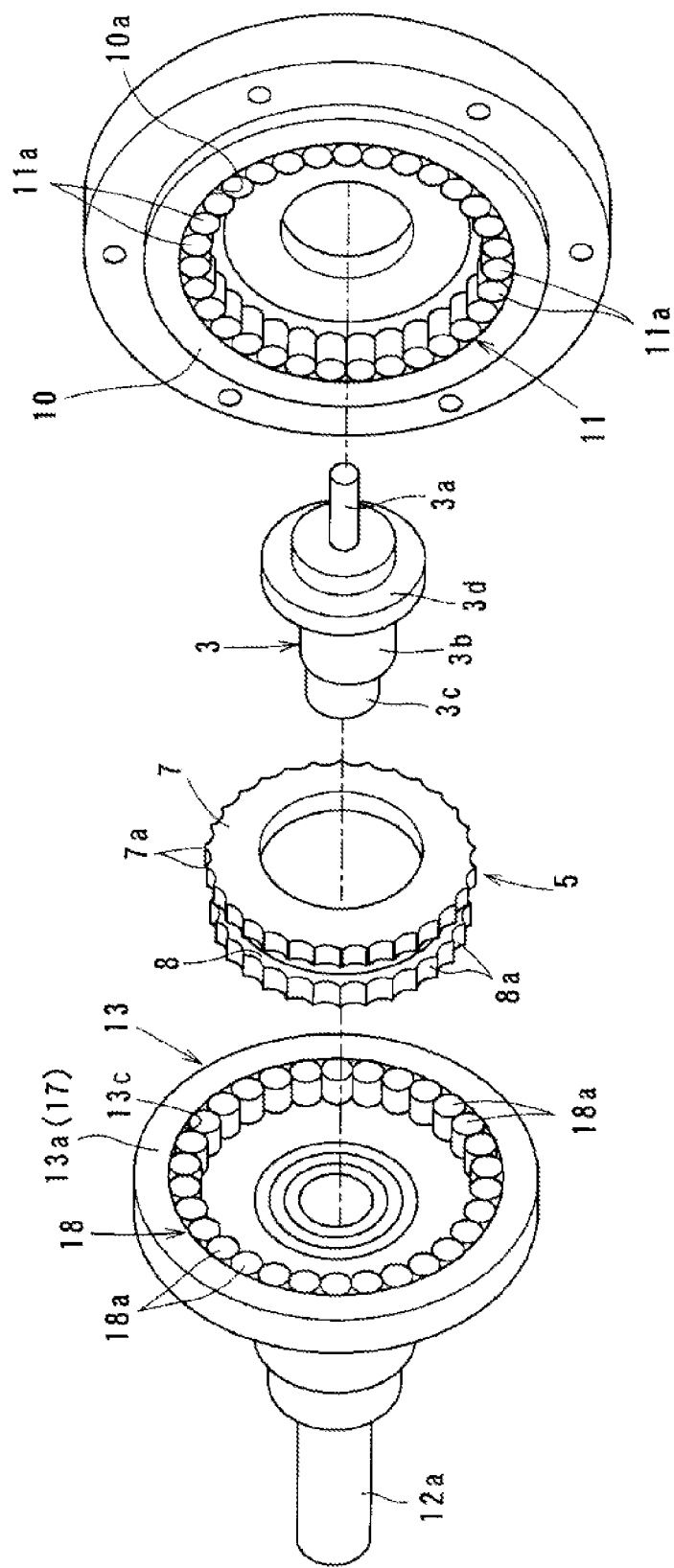
FIG. 2 is an exploded perspective view of a rotational ring, an array of controllable pin rollers, a transmission ring body, a shaft, a stationary ring and an array of transmission pin rollers.

The array 11 of transmission pin rollers consists of pin rollers 11a each shaped identically into columnar configuration as also shown in FIG. 2.

Figure 3:
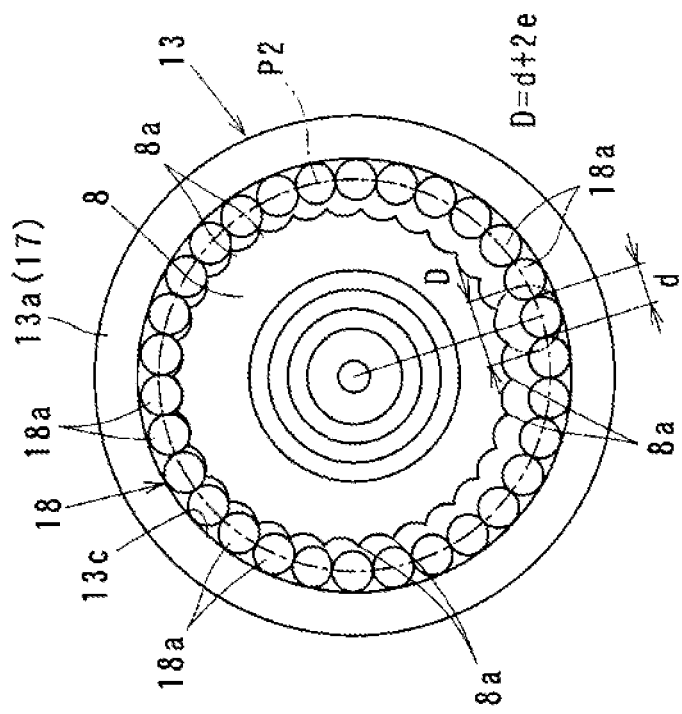
FIG. 3 is a plan view of the stationary ring into which the array of transmission pin rollers is press fit in a circular fashion.

As shown in FIG. 3, each of the pin rollers 11a has an outer side surface located in line contact with the inner side surface 10a of the stationary ring 10 after the array 11 of transmission pin rollers is press fit into the stationary ring 10 in pressure exerting relationship with each other along a basic circle P1 circumferentially. The basic circle P1 is formed on the condition that a center of each of the pin roller 11a is connected in concentric relationship with the stationary ring 10 when the pin rollers 11a are circumferentially arranged in the circular fashion.

The number of the pin rollers 11a is counted as 31 in total which is more than the number of the outer teeth 7a of the transmission ring gear 7 by the number of one. The way the array 11 of transmission pin rollers is press fit into the stationary ring 10, is the same as a way an array 18 of controllable pin rollers is press fit into a controllable ring 17 as described in detail hereinafter.

In this instance, the transmission ring gear 7 has a plurality of the outer teeth 7a always meshing with the corresponding pin rollers 11a of the array 11 of transmission pin rollers. More specifically, two or three of the outer teeth 7a are brought into all-time engagement with two or three of the pin rollers 11a at their meshing portion. Namely, the transmission ring gear 7 always engages the outer teeth 7a with the respective pin rollers 11a, the number of which is the same as the outer teeth 7a is counted.

As observed in FIG. 1, a rotational body 12 is in the form of a cup-shaped configuration, and has a rotational ring 13 located within the housing 2 and an output shaft 12a provided to extend outside from the housing 2. An open-ended portion of the rotational ring 13 is in the cylindrical form of a two-stepped configuration having a diameter-increased ring portion 13a and a diameter-reduced ring portion 13b. The output shaft 12a is coaxially aligned with the input shaft portion 3a of the shaft 3, and rotatably supported at an open-ended section of the second housing portion 2b by means of a ball bearing 14.

The rotational ring 13 have the diameter-increased ring portion 13a rotationally supported at the support portion 3c of the shaft 3 by means of a ball bearing 15. Between the diameter-reduced ring portion 13b and an inner surface of the second housing portion 2b, a ball bearing 16 is concentrically provided. The diameter-increased ring portion 13a axially opposes the stationary ring 10 as a controllable ring 17, an inner side surface 13c of which has the array 18 of controllable pin rollers arranged in a circular fashion.

Figure 4:
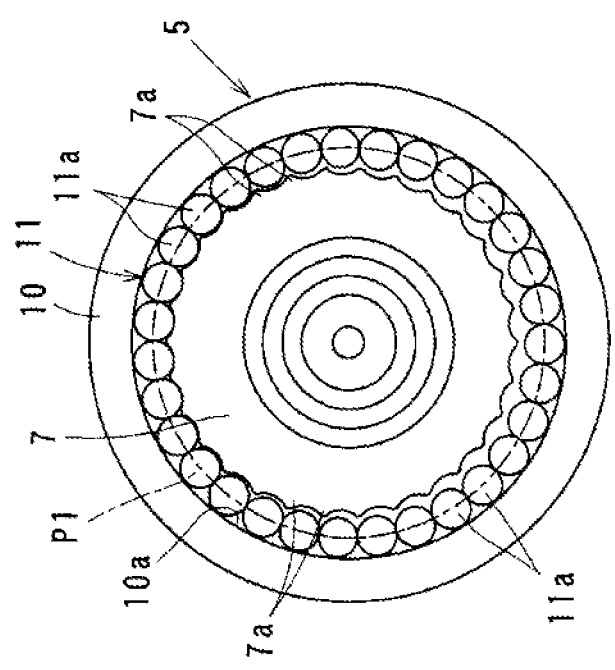
FIG. 4 is a plan view of the rotational ring into which the array of controllable pin rollers is press fit in a circular fashion.

The array 18 of controllable pin rollers consists of pin rollers 18a each shaped identically into columnar configuration as also shown in FIG. 4.

Each of the pin rollers 18a has an outer side surface located in line contact with the inner side surface 13c of the controllable ring 17 after the array 18 of controllable pin rollers is press fit into the controllable ring 17 in pressure exerting relationship with each other along a basic circle P2 circumferentially. The basic circle P2 is formed on the condition that a center of each of the pin roller 18a is connected in concentric relationship with the controllable ring 17 when the pin rollers 18a are circumferentially arranged in the circular fashion.

The number of the pin rollers 18a are counted as 30 in total which is the same as the number of the outer teeth 8a of the controllable ring gear 8.

In this instance, the controllable ring gear 8 has a plurality of the outer teeth 8a always meshing with the respective pin rollers 18a. More particularly, two or three of the outer teeth 8a are brought into all-time engagement with two or three of the pin rollers 18a at their meshing portion. Namely, the controllable ring gear 8 always engages the outer teeth 8a with the respective pin rollers 18a, the number of which is the same as the outer teeth 8a is counted.

Each of the outer teeth 8a has an arced diameter (D) which is determined to be equal to a diameter (d) of the pin rollers 18a plus a two-fold quantity of the eccentricity (e) of the eccentric shaft portion 3b (D=d+2e).

Figure 5:
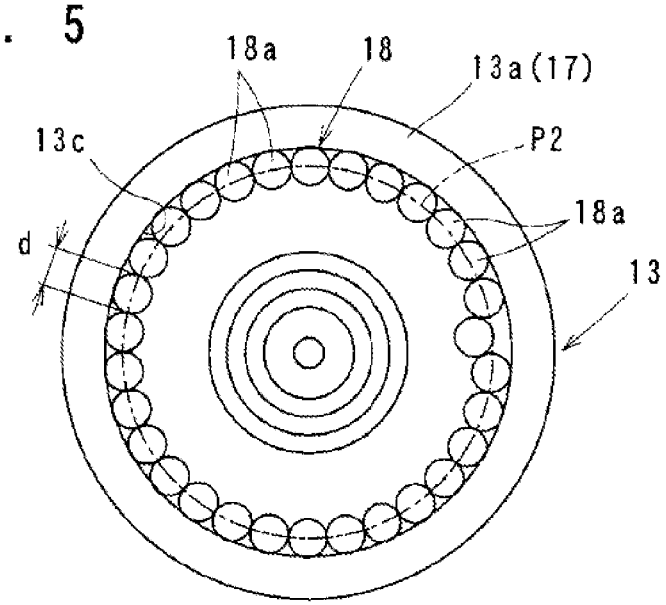
FIG. 5 is a plan view showing a procedure how the array of controllable pin rollers is arranged along an inner side surface of the rotational ring.

Upon press fitting the array 18 of controllable pin rollers into the controllable ring 17 as shown in FIG. 5, the thirty pin rollers 18a are arranged circumferentially along the basic circle P2 with only one pin roller 18a positioned out of the place.

Figure 6:
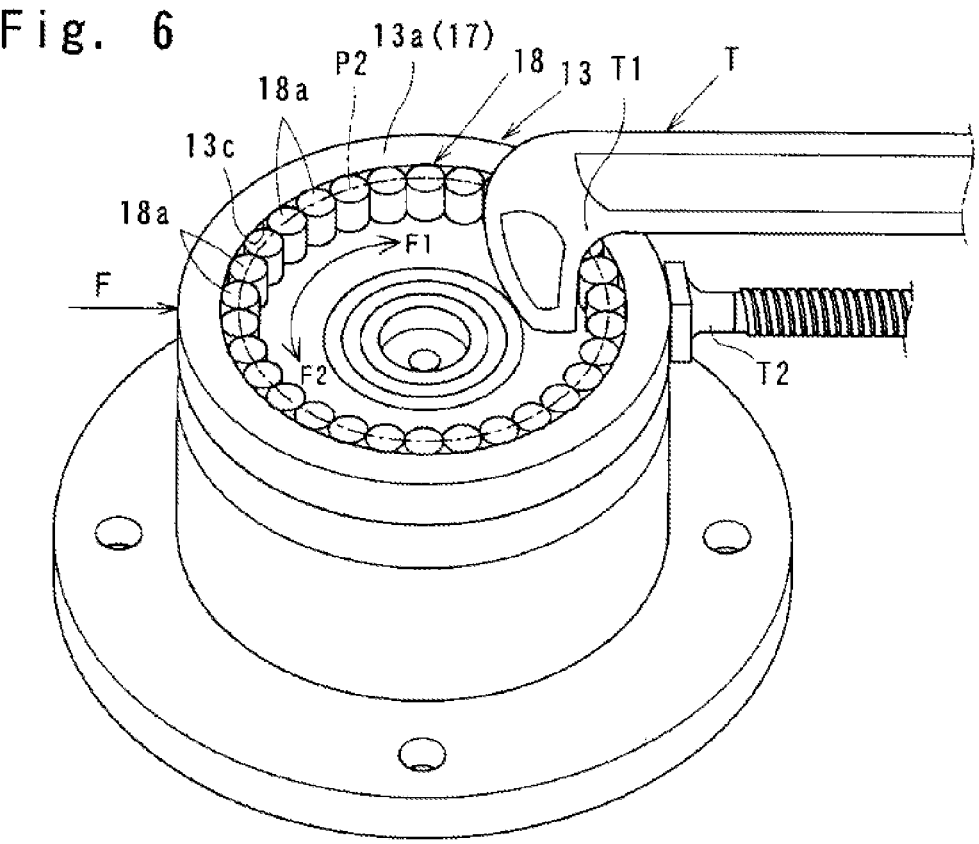
FIG. 6 is a perspective view showing a procedure how the array of controllable pin rollers is press fit into the rotational ring in the circular fashion with the use of a special tool.

As shown in FIG. 6, a vise T is used as a special tool to press the one pin roller 18a with two hand pieces T1, T2 to force the one pin roller 18a to locate along the basic circle P2 between the abutting two pin rollers 18a (press-fitting procedure).

The pin rollers 18a are arranged such that an exterior force F radially applied to the array 18 of controllable pin rollers is diverted into two components F1, F2 along the basic circle P2 in opposite directions, so as to exert a pressure on the array 18 of controllable pin rollers to be in the circular fashion.

Upon implementing the press-fitting procedure, it is necessary to predetermine a length of the basic circle P2 to be slightly smaller than a theoretical circumferential length of the array 18 of controllable pin rollers arranged in the circular fashion. The length of the basic circle P2 is obtained by consecutively connecting centers of the abutting pin rollers 18a one after another when the array 18 of controllable pin rollers is press fit into the controllable ring 17.

It is to be noted that instead of the press-fitting procedure, a shrinkage-fit procedure may be used in which the controllable ring 17 is previously heated to expand before press fitting the array 18 of controllable pin rollers into the controllable ring 17. The pin rollers 18a may be bonded each other by means of a welding procedure or the like when arranged in the circular fashion.

Alternatively, a fixing means may be used to supplementarily bond the array 18 of controllable pin rollers to the inner side surface of the controllable ring 17 with an adhesive (glue) as a complementary agent.

With the structure thus described, an electric motor (not shown) is energized to rotationally drive the input shaft portion 3a of the shaft 3 so as to eccentrically rotate the eccentric shaft portion 3b. The eccentric shaft portion 3b transmits its eccentric rotation to the transmission ring body 5 by means of the ball bearing 6. Then, as shown in FIG. 3, the transmission ring gear 7 nutationally moves within the stationary ring 10 while making the outer teeth 7a slide over the pin rollers 11a with some of the outer teeth 7a always engaging with the respective pin rollers 11a. The nutational movement which the transmission ring gear 7 performs, is a compound motion consisting of a rotational movement and revolving movement.

The nutational movement of the transmission ring gear 7 accompanies the controllable ring gear 8 with the compound movement.

In association with the controllable ring gear 8 being nutationally moved as shown in FIG. 4, the controllable ring gear 8 makes the outer teeth 8a drive the pin rollers 18a with some of the outer teeth 8a always engaging with the respective pin rollers 18a. Then, the controllable ring gear 8 transmits only the revolving movement to the controllable ring 17 so as to rotationally drive the output shaft 12a by means of the rotational ring 13.

The output shaft 12a drives a transfer arm which is incorporated into an industrialized robot (not shown) to bring component parts from one place to another during manufacturing processes.

The speed reduction ratio (R) of the output shaft 12a against the input shaft portion 3a is specifically calculated as follows.

$$R = 1 - (JK/LM)$$

Where

J (=31) is the number of the pin rollers 11a of the array 11 of transmission pin rollers, L (=30) is the number of the outer teeth 7a of the transmission ring gear 7, K (=30) is the number of the pin rollers 18a of the array 18 of controllable pin rollers, and M (=30) is the number of the outer teeth 8a of the controllable ring gear 8.

By applying the numbers to the above formula, a higher speed reduction ratio is obtained as R=1−(30×31/30×30)=− 1/30. The speed reduction ratio (R) is expressed by a legend of minus sign. This means that the output shaft 12a rotates in a way opposite to the direction in which the input shaft portion 3a rotationally moves.

It is to be noted that the above numbers J, L, K and M are not confined to 31, 30, 30 and 30, but determined as desired under the presence of an integral difference in number between the number J of the pin rollers 11a and the number L of the outer teeth 7a. By way of illustration, the numbers J, L, K and M may be altered to be 30 (29), 28 (26), 28 (25) and 28 (25). However, it is necessary to always set the number K to be equal to the number M.

In the above structure, the array 11 of transmission pin rollers is press fit to be circularly arranged along the inner side surface 10a of the stationary ring 10, and the array 18 of controllable pin rollers is press fit to be circularly arranged along the inner side surface 13c of the controllable ring 17. To the pin rollers 11a (18a), employed are high precision cylindrical rollers or needle rollers which are usually used for a roller bearing or the like. The array 11 of transmission pin rollers and the array 18 of controllable pin rollers work as outer teeth to make a backlash phenomenon minimum, thus achieving a precise pitch distance between the pin rollers 11a (18a), maintaining a uniform tooth profile with a high precision, equalizing a surface roughness and improving a meshing precision between the pin rollers 11a (18a) and the transmission ring gear 7 (controllable ring gear 8) for realizing a smooth and precise speed reduction movement.

In order to assemble the array 11 of transmission pin rollers and the array 18 of controllable pin rollers, it is sufficient to press fit the pin rollers 11a circularly along the inner side surface 10a of the stationary ring 10, while at the same time, press fitting the pin rollers 18a circularly along the inner side surfaces 13c of the controllable ring 17 (rotational ring 13).

This reduces the number of assembly processes and makes the whole structure compact with the pin rollers 11a (18a) closely aligned circularly. Since the pin rollers 11a (18a) are generally inexpensive, it becomes possible to render the roller type transmission device 1 advantageous in cost and conducive to mass production with the simplified assembly procedures.

Since the transmission ring gear 7 always engages some of its outer teeth 7a with the respective pin rollers 11a, while the controllable ring gear 8 always engages some of its outer teeth 8a with the respective pin rollers 18a, it becomes possible to transmit the rotational movement from the transmission ring gear 7 to the controllable ring gear 8 at the least amount of friction with a high torque (high torque transmission).

By employing a bearing steel to the pin rollers 11a (18a), it becomes possible to provide the array 11 of transmission pin rollers and the array 18 of controllable pin rollers with a high mechanical strength.

Since the arced diameter (D) of the outer teeth 17a of the controllable ring gear 17 is determined to be equal to the outer diameter (d) of the pin rollers 18a of the array 18 of controllable pin rollers plus a two-fold quantity of the eccentricity (e) of the eccentric shaft portion 3d, by determining the dimensional relationship as (D=d+2e), it becomes possible to constitute an adjustment mechanism which takes out only the rotational movement from the compound movement consisting of the rotational movement and the revolving movement.

This makes it possible to contribute to make the whole structure compact with the simplified adjustment mechanism in comparison with the prior structure in which the adjustment plate and the pins form the counterpart adjustment mechanism.

FIGS. 7, 8 show a second embodiment of the invention in which a metal retainer 19 is provided in the form of a thin and annular plate configuration. As shown in FIG. 7, the retainer 19 has a width (H) identical to the diameter (d) of the pin rollers 18a, while at the same time, having an outer diameter (D1) dimensionally corresponding to an inner diameter (D2) of the controllable ring 17.

As shown in FIG. 8, the retainer 19 is concentrically located on one end side of the array 18 of controllable pin rollers so as to be fixed to each center (Gp) of the pin rollers 18a by means of welding procedure (e.g., resistance welding, TIG welding, plasma welding or laser welding procedure).

With the retainer 19 fixed as above, it becomes possible to firmly maintain the array 18 of controllable pin rollers in the circular fashion.

Instead of the welding procedure, a machine screw may be used to fix the metal retainer 19 to the array 18 of the pin rollers. The width (H) of the retainer 19 is not necessarily equal to the diameter (d) of the pin rollers 18a, and the width (H) of the retainer 19 may be greater than the diameter (d) of the pin rollers 18a.

Figure 9:
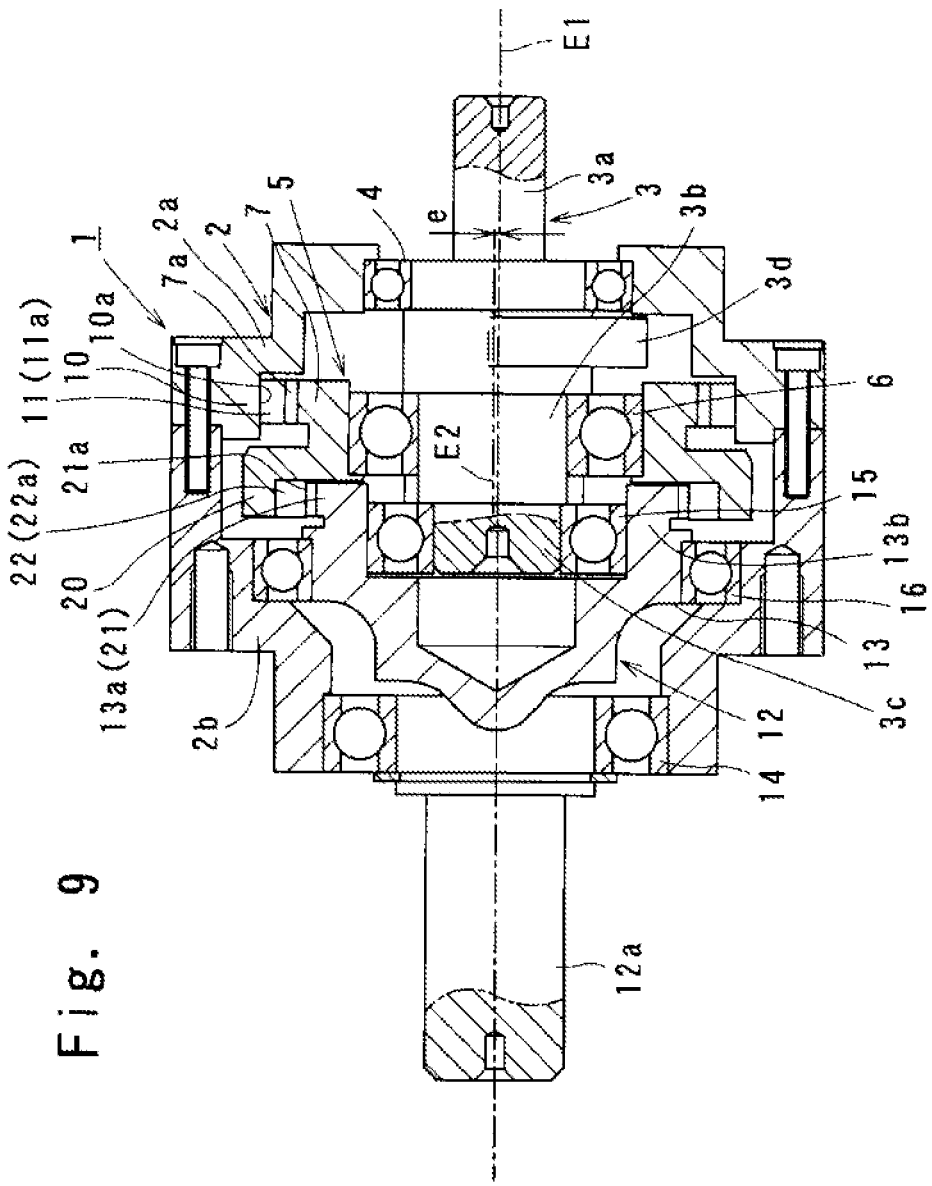
FIG. 9 is a longitudinal cross sectional view of a roller type transmission device according to a third embodiment of the invention.

FIG. 9 shows a third embodiment of the invention in which the controllable ring 20 is provided on the other periphery side of the transmission ring body 5 in lieu of the controllable ring gear 8, and the controllable ring gear 21 is provided on the diameter-increased ring portion 13a of the rotational ring 13 in lieu of the array 18 of controllable pin rollers. Namely, an array 22 of controllable pin rollers 22a is press fit into a controllable ring 20, and teeth 21a of a controllable ring gear 21 are circumferentially defined continuously on an outer surface of the diameter-increased ring portion 13a. This makes some of the controllable pin rollers 22a always engage with the respective teeth 21a of the controllable ring gear 21.

In the roller type transmission device in which the controllable ring 20 is placed in lieu of the controllable ring gear 8, and the controllable ring gear 21 is placed in lieu of the array 18 of controllable pin rollers, the same advantages as obtained in the first embodiment of the invention are achieved.

Figure 10:
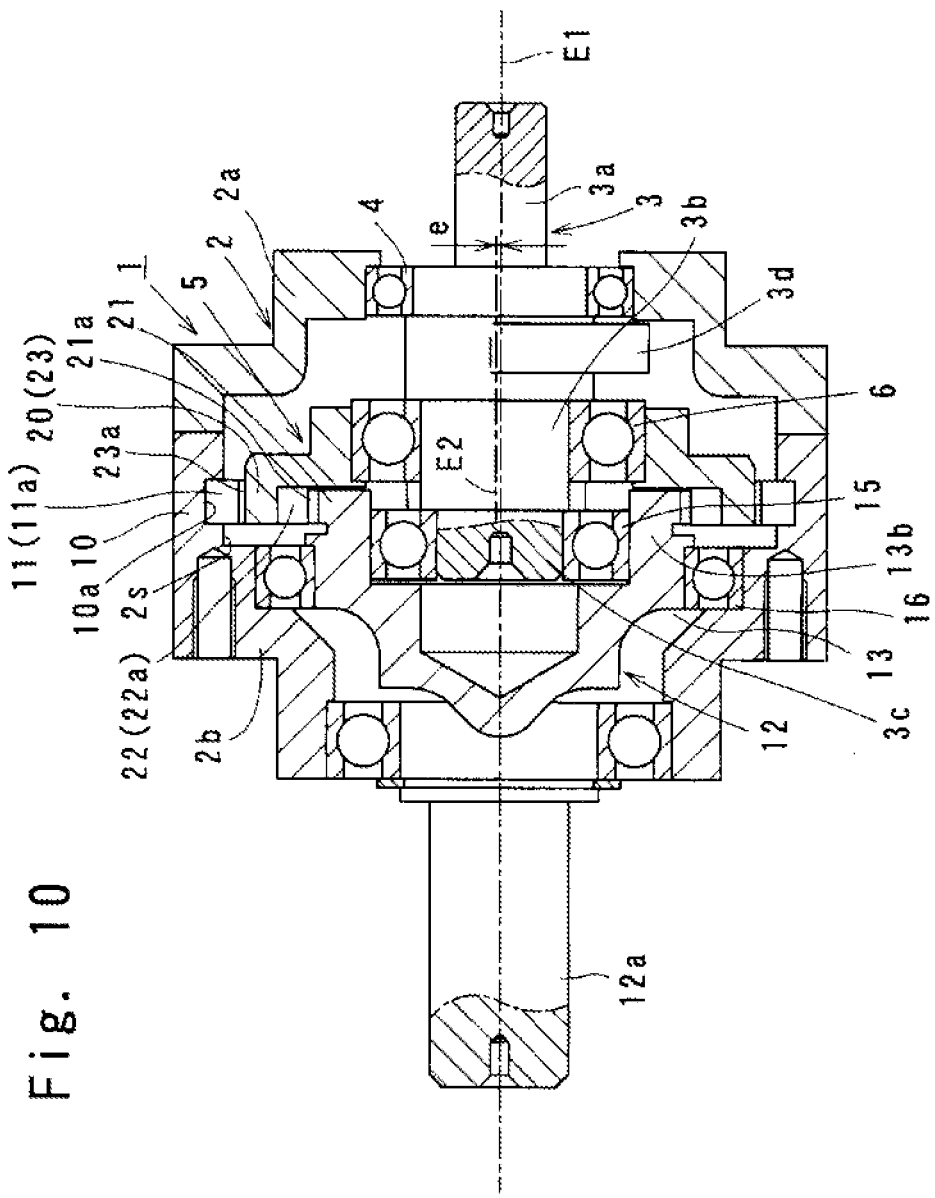
FIG. 10 is a longitudinal cross sectional view of a roller type transmission device according to a fourth embodiment of the invention.

FIG. 10 shows a fourth embodiment of the invention in which a transmission ring gear 23 is provided at an outer periphery of the controllable ring 20 in lieu of the transmission ring body 5. The transmission ring gear 23 has an outer side surface, around which outer teeth 23a is consecutively provided circumferentially.

Such is the structure that the stationary ring 10 is provided at an inner side surface 2s of the housing 2 to be located around the transmission ring gear 23 in concentric relationship with the rotational ring 13, so as to place the stationary ring 10, the array 11 of transmission pin rollers, the transmission ring gear 23, the controllable ring 20, the array 22 of controllable pin rollers and the controllable ring gear 21 in concentrically overlapping relationship with each other.

This makes it possible to reduce the width of the above component members 10, 11, 23, 20, 21, 22, thereby axially decreasing the whole structure to make the roller type transmission device 1 compact.

Figure 11:
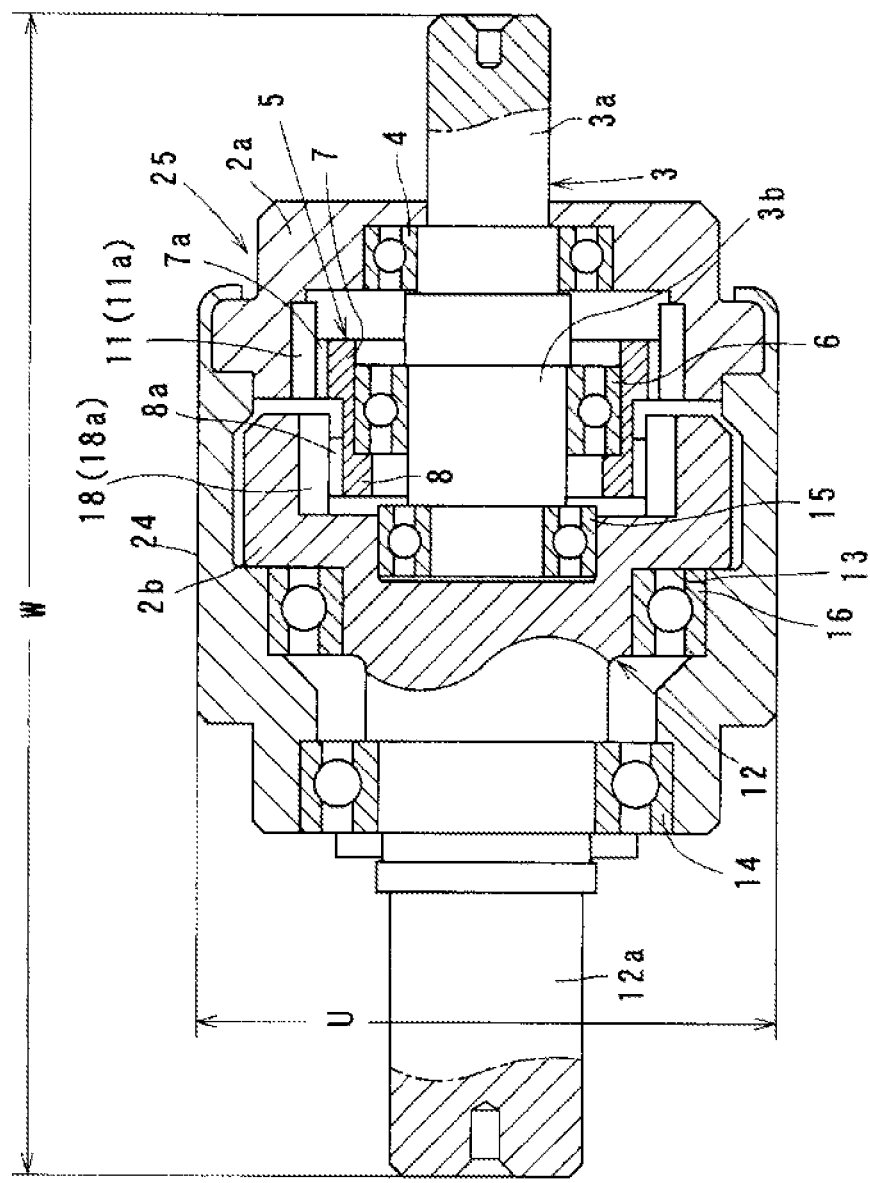
FIG. 11 is a longitudinal cross sectional view of a roller type transmission device miniaturized according to a fifth embodiment of the invention.

FIG. 11 shows a fifth embodiment of the invention in which pin rolers 11a, 18a are diametrically reduced to be 1 mm or less than 1 mm, and a roller type transmission device 25 is dimensionally miniaturized to a significant degree.

Instead of the housing 2 of the first embodiment of the invention, a one-piece type tubular housing 24 is provided. An axial length of the shaft 3 corresponds to an entire length (W) of the roller type transmission device 25, and measures 15-40 mm. An outer diameter (U) of the tubular housing 24 corresponds to an entire diameter of the roller type transmission device 25, and measures 12-25 mm.

The roller type transmission device 25 is miniaturized to such an extent as to be adaptable to a limited region such as, for example, a robotized brachiation. It is to be noted in FIG. 11 that the roller type transmission device 25 is dimensionally exaggerated in comparison with the real size.

Figure 12:
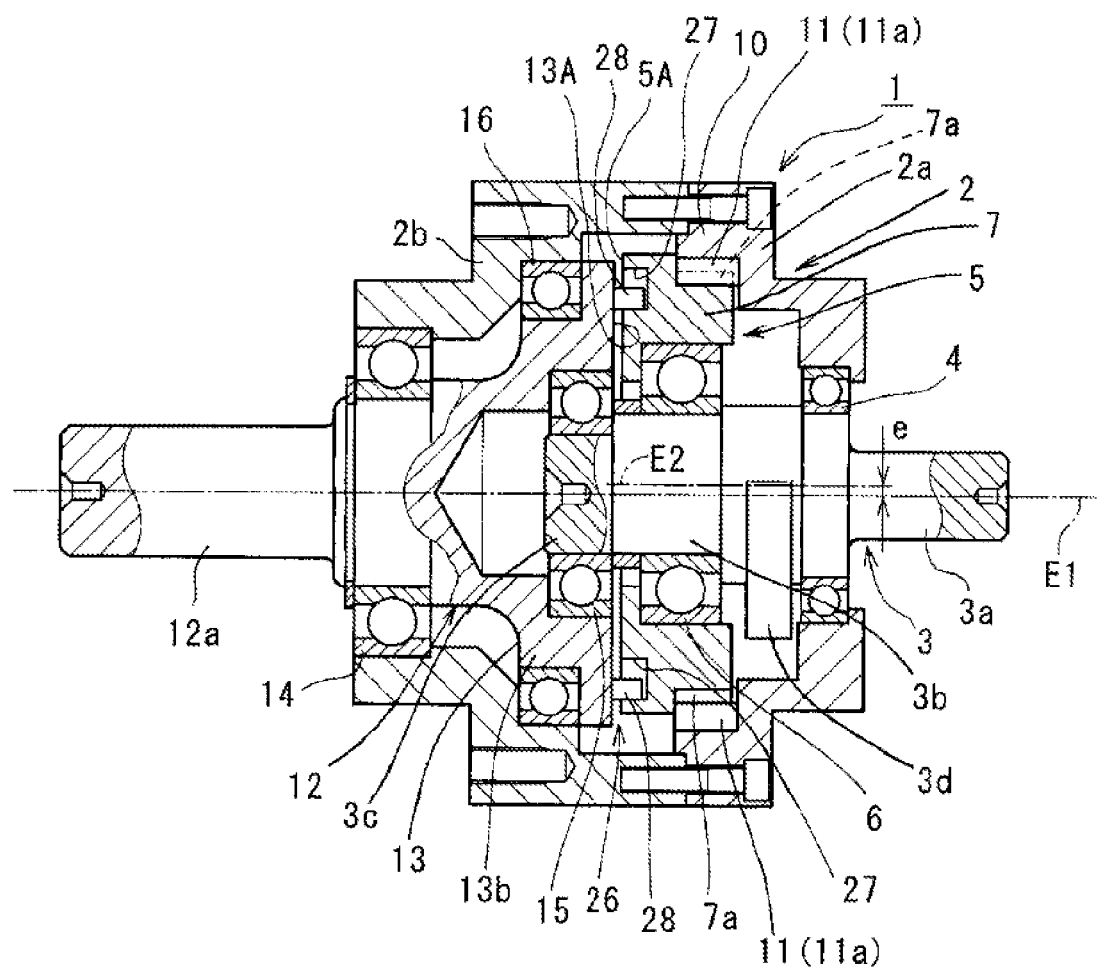
FIG. 12 is a longitudinal cross sectional view of a roller type transmission device according to a sixth embodiment of the invention.
Figure 13:
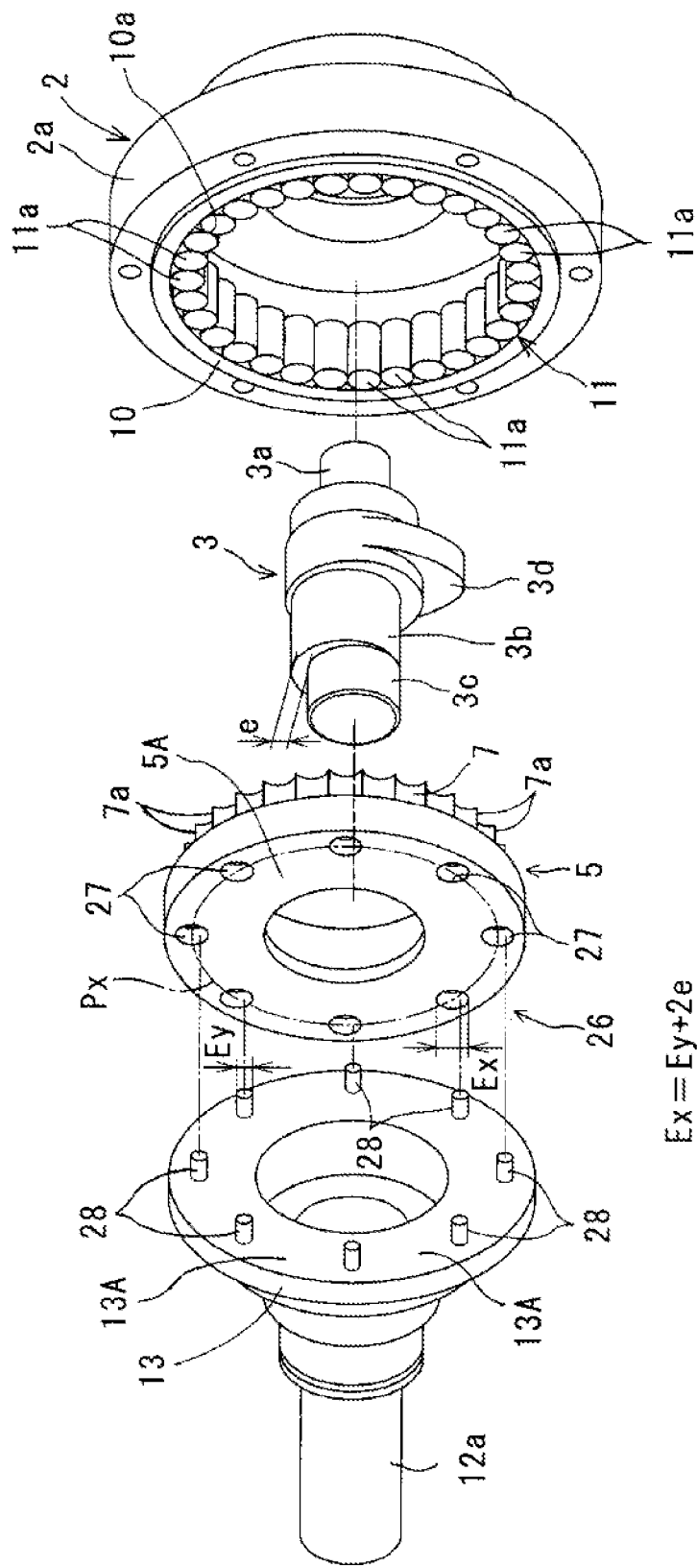
FIG. 13 is an exploded perspective view of the rotational ring, the array of controllable pin rollers, the transmission ring body, the shaft, the stationary ring and the array of transmission pin rollers.

FIGS. 12 and 13 show a sixth embodiment of the invention in which the controllable ring gear 8, the outer teeth 8a, the array 18 of controllable pin rollers and the diameter-increased ring portion 13a are omitted, and instead an adjustment mechanism 26 is provided as observed in FIG. 12.

The adjustment mechanism 26 is placed between the other peripheral side 5A of the transmission ring body 5 and an open end side 13A of the rotational ring 13 in order to take out only the rotational movement from the eccentricrotation of the transmission ring body 5 to transmit the rotational movement to the rotational ring 13 when operated.

In the adjustment mechanism 26, eight circular cavities 27 are provided on the other peripheral side 5A of the transmission ring body 5 along a predetermined circle Px as observed in FIG. 13.

On the open end side 13A of the rotational ring 13, eight pins 28 are formed in perpendicular to the open end side 13A in registration with the corresponding cavities 27. A diametrical dimension Ex of the circular cavity 27 is equal to a two-fold of the eccentricity (e) of the eccentric shaft portion 3b plus a diametrical dimension Ey of the pin 28 (Ex=Ey+2e). For this reason, the pins 28 come in sliding contact with circumferential wall surfaces of the corresponding cavities 27 when operated.

In combination with the eccentric rotation of the transmission ring body 5, the transmission ring body 5 slides the circumferential wall surfaces of the cavities 27 along the outer surface of the corresponding pins 28.

During the process, the transmission ring body 5 leaves the revolving movement as a lost motion against the rotational ring 13, so that the transmission ring body 5 transmits only the rotational movement to the rotational ring 13 as an output power.

In the sixth embodiment of the invention, the adjustment mechanism 26 makes it possible to take out only the rotational movement from the transmission ring body 5 in order to transmit the rotational movement to the rotational ring 13.

With the pins 28 provided on the transmission ring body 5 and the cavities 27 on the rotational ring 13, it becomes possible to readily manufacture and assemble the adjustment mechanism 26 so as to make its product cost-effective.

It is to be noted that the pins 28 may be provided on the transmission ring body 5 and the circular cavities provided on the rotational ring 13. The number of the cavities 27 is not confined to eight, but it may be altered within the range of e.g., 4-32 and determined as desired depending on usage and mounting situation. Around each of the pins 28, provided may be a tubular bush which comes in sliding contact with the circumferential wall surfaces of the cavities 27.

Figure 14:
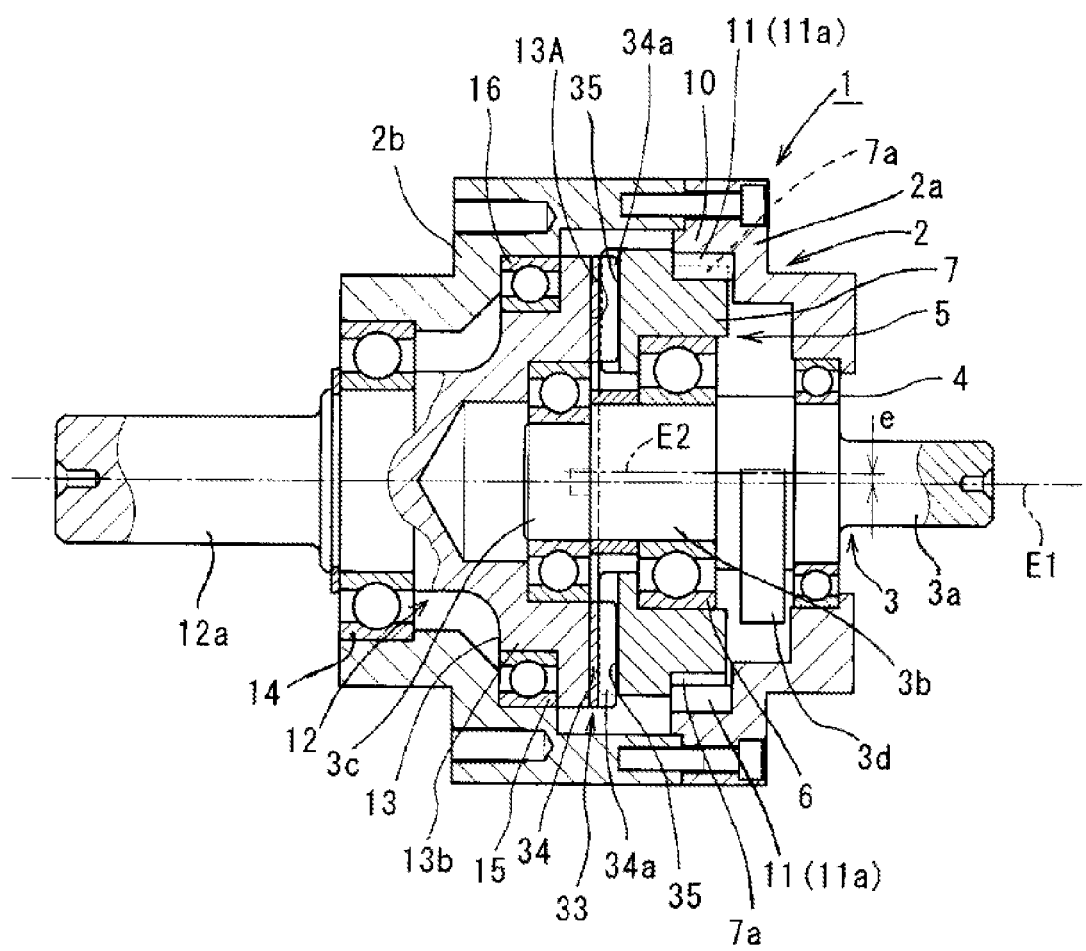
FIG. 14 is a longitudinal cross sectional view of a roller type transmission device according to a seventh embodiment of the invention.
Figure 15:
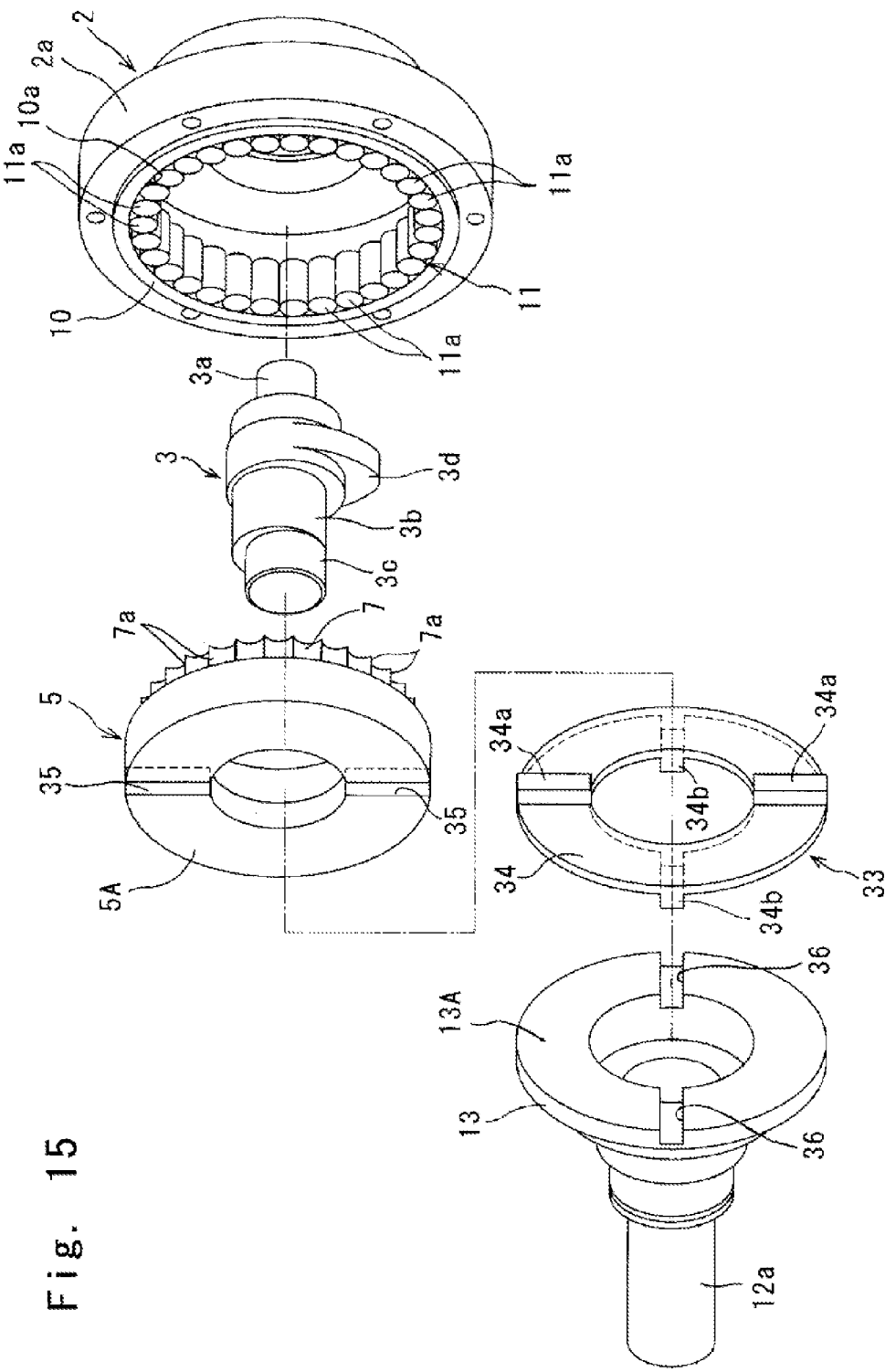
FIG. 15 is an exploded perspective view of the rotational ring, the array of controllable pin rollers, the transmission ring body, the shaft, the stationary ring and the array of transmission pin rollers.

FIGS. 14 and 15 show a seventh embodiment of the invention in which Oldham's shaft coupling is provided as an adjustment mechanism 33.

In the adjustment mechanism 33 as observed in FIG. 14, an annular adjustment plate 34 provided between the other peripheral side 5A of the transmission ring body 5 and an open end side 13A of the rotational ring 13.

As observed in FIG. 15, one side surface of the adjustment plate 34 has a pair of first radial blades 34a in the diametrical direction, and the other side surface of the adjustment plate 34 has a pair of second radial blades 34b in crossing relationship with the first radial blades 34a.

A pair of first streak of radial grooves 35 is provided on the other peripheral side 5A of the transmission ring body 5 to slidably receive the first radial blades 34a along the diametrical direction. A pair of second streaks of radial groove 36 is provided on the open end side 13A of the rotational ring 13 to slidably receive the second radial blades 34b along the diametrical direction.

The first radial blades 34a is in crossing relationship with the second radial blades 34b within an angular range of e.g., 35-125 degrees. Upon eccentrically rotating the transmission ring body 5, the adjustment plate 34 rotates while sliding the first radial blades 34a along the first streaks of radial groove 35, and sliding the second radial blades 34b along the second streaks of radial groove 36.

During the process, the transmission ring body 5 leaves the revolving movement as a lost motion against the rotational ring 13, so that the transmission ring body 5 transmits only the rotational movement to the rotational ring 13 as the output power.

With the Oldham's shaft coupling employed as the adjustment mechanism 33, it becomes possible to make the adjustment mechanism 33 structurally simple and advantageous in cost since the adjustment mechanism 33 is readily available as existent ones.

It is to be noted that the first radial blades 34a may be provided on the transmission ring body 5, and the second radial blades 34b on the rotational ring 13 with the first streaks of radial groove 35 and the second streaks of radial groove 36 both defined on the adjustment plate 34.

In an eighth embodiment of the invention, the controllable ring 17 and the array 18 of controllable pin rollers are integrally formed each other, and the stationary ring 10 and the array 11 of transmission pin rollers are integrally formed each other.

This makes it possible to readily profile the arced teeth from the controllable pin rollers 18a and the transmission pin rollers 11a.

In a ninth embodiment of the invention, the controllable ring 17 and the array 18 of controllable pin rollers are integrally formed each other with the use of a sintering alloy. The stationary ring 10 and the array 11 of transmission pin rollers are also integrally formed each other with the use of a sintering alloy.

With the use of the sintering alloy as an integrally forming material, it becomes possible to render the controllable ring 17 and the stationary ring 10 dimensionally precise with simplified procedures.

As the sintering material, used are metal-based substances such as, for example, powder of copper, iron, alloyed steel, cobalt, nickel, zirconium, titanium, molybdenum, tungsten carbonate or the like.

In a tenth embodiment of the invention, the controllable ring 17 and the array 18 of controllable pin rollers are integrally formed each other with the use of a synthetic material. The stationary ring 10 and the array 11 of transmission pin rollers are also integrally formed each other with the use of a synthetic material.

With the use of the synthetic material as an integrally forming matter, it becomes possible to make the stationary ring 10 and the controllable ring 17 lightweight and durable when applied to a canti-lever arm of an industrialized robot.

As the synthetic material, used are engineering plastics such as, for example, polyethylene (PE). polypropylene (PP), polycarbonate (PC), polyethylene terephthalate (PBTF), polypropylene (PPE).

It is to be noted that the adjustment mechanism 26, 33 in the sixth and seventh embodiment may be applied to the adjustment mechanism in the third to the fifth embodiments of the invention.

It is also to be noted that the angular range in which the first radial blade 34a forms against the second radial blade 34b in the seventh embodiment of the invention is not confined to 35-125 degrees, but it may be determined as desired depending on usage and mounting situation.

It is to be appreciated that the transmission ring gear 7 may profile the outer teeth 7a along a peritrochoidal, epicycloidal or hypocycloidal curve (cycloidal-based curve) instead of the trochoidal curve.

Each of the transmission pin rollers 11a and the controllable pin rollers 18a may be constricted in the middle as a drum-like configuration.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A roller type transmission device comprising:
   a housing provided to rotatably accommodate a shaft which has an eccentric shaft portion;
   a stationary ring having a predetermined width, and provided within said housing in concentric relationship with said shaft;
   a rotational body fixedly placed within said housing in concentric relationship with said shaft, and having an open-ended portion which fixedly places a controllable ring as a rotational ring in concentric relationship with said stationary ring;
   an array of transmission pin rollers having a predetermined number of pin rollers which are press fit into said stationary ring along a certain circle line to be in line contact with an inner side surface of said stationary ring with the abutting pin rollers pressure exerted circularly in line contact with each other;
   an array of controllable pin rollers having a predetermined number of pin rollers which are press fit into said rotational ring along a certain circle line to be in line contact with an inner side surface of said rotational ring with the abutting pin rollers pressure exerted circularly in line contact with each other;
   a transmission ring body rotatably secured to said eccentric shaft portion within said stationary ring and said rotational ring so as to eccentrically rotate with rotational and revolving movement accompanied in combination with a rotational movement of said shaft;
   a transmission ring gear provided to have outer teeth circumferentially formed continuously at one peripheral side of said transmission ring body with said outer teeth profiled along a trochoidal curve, some of said outer teeth always engaging with a plurality of said pin rollers of said transmission pin rollers;
   a controllable ring gear provided to have outer teeth circumferentially formed continuously at the other peripheral side of said transmission ring body with said outer teeth profiled along a circular of arc, some of said outer teeth always engaging with a plurality of said pin rollers of said controllable pin rollers; and
   an arced diameter of said outer teeth of said controllable ring gear being equal to an outer diameter of said pin rollers of said array of controllable pin rollers plus a two-fold quantity of an eccentricity of said eccentric shaft portion, and making an integral difference in number between number of the pin rollers of said array of transmission pin rollers and number of said teeth of said transmission ring gear.

2. A roller type transmission device comprising:
   a housing provided to rotatably accommodate a shaft which has an eccentric shaft portion;
   a stationary ring having a predetermined width, and provided within said housing in concentric relationship with said shaft;
   a rotational body fixedly placed within said housing in concentric relationship with said shaft, and having an open-ended portion which fixedly places a rotational ring in concentric relationship with said stationary ring;
   an array of transmission pin rollers having a predetermined number of pin rollers which are press fit along a certain circle line into said stationary ring to be in line contact with an inner side surface of said stationary ring with the abutting pin rollers pressure exerted circularly in line contact with each other;
   a transmission ring body rotatably secured to said eccentric shaft portion between said stationary ring and said rotational body so as to eccentrically rotate with rotational and revolving movement accompanied in combination with a rotational movement of said shaft;
   a transmission ring gear provided to have outer teeth circumferentially formed continuously at one peripheral side of said transmission ring body with said outer teeth profiled along a trochoidal curve, some of said outer teeth always engaging with a plurality of said pin rollers of said transmission pin rollers;
   a controllable ring provided at the other peripheral side of said transmission ring body to be in registration with said stationary ring;
   an array of controllable pin rollers having a predetermined number of pin rollers which are press fit into said controllable ring along a certain circle line to be in line contact with an inner side surface of said controllable ring with the abutting pin rollers pressure exerted circularly in line contact with each other;
   a controllable ring gear provided to have outer teeth circumferentially formed continuously at one peripheral side of said rotational ring with said outer teeth profiled along a circular of arc, some of said outer teeth always engaging with a plurality of said pin rollers of said controllable pin rollers; and
   an arced diameter of said outer teeth of said controllable ring gear being equal to an outer diameter of said pin rollers of said array of controllable pin rollers plus a two-fold quantity of an eccentricity of said eccentric shaft portion, and making an integral difference in number between number of the pin rollers of said array of transmission pin rollers and number of said teeth of said transmission ring gear.

3. The roller type transmission device according to claim 2, wherein instead of said one peripheral side of said transmission ring body, said transmission ring gear is provided at an outer periphery of said controllable ring so that said stationary ring is provided at an inner side surface of said housing to be located around said transmission ring gear in concentric relationship with said rotational ring, so as to place said stationary ring, said array of transmission pin rollers, said transmission ring gear, said controllable ring, said array of controllable pin rollers and said controllable ring gear in overlapping and concentric relationship with each other.

4. The roller type transmission device according to claim 1 or 2, wherein an annular retainer is secured to each end surface of said array of controllable pin rollers, and another annular retainer is secured to each end surface of said array of transmission pin rollers by means of welding procedure.

5. The roller type transmission device according to claim 1 or 2, wherein said controllable ring and said array of controllable pin rollers are integrally formed each other, and said stationary ring and said array of transmission pin rollers are integrally formed each other.

6. The roller type transmission device according to claim 1 or 2, wherein said controllable ring and said array of controllable pin rollers are integrally formed each other with the use of a sintering alloy, and said stationary ring and said array of transmission pin rollers are integrally formed each other with the use of a sintering alloy.

7. The roller type transmission device according to claim 1 or 2, wherein said controllable ring and said array of controllable pin rollers are integrally formed each other with the use of a synthetic material, and said stationary ring and said array of transmission pin rollers are integrally formed each other with the use of a synthetic material.

8. The roller type transmission device according to claims 1 or 2, wherein an entire length measures 15-40 mm in an axial direction and an outer diameter measures 12-25 mm in a diametrical direction with both diameters of said pin rollers reduced to be 1 mm or less than 1 mm.

9. A roller type transmission device in which a housing is provided to rotatably accommodate a shaft which has an eccentric shaft portion, and a stationary ring has a predetermined width, and provided within said housing in concentric relationship with said shaft, comprising:
- a rotational body fixedly placed within said housing in concentric relationship with said shaft, and having an open-ended portion which fixedly places a controllable ring as a rotational ring in concentric relationship with said stationary ring;
- an array of transmission pin rollers having a predetermined number of pin rollers which are press fit into said stationary ring along a certain basic circle to be in line contact with an inner side surface of said stationary ring with the abutting pin rollers pressure exerted circularly in line contact with each other;
- an array of controllable pin rollers having a predetermined number of pin rollers which are press fit into said rotational ring along a certain basic circle to be in line contact with an inner side surface of said rotational ring with the abutting pin rollers pressure exerted circularly in line contact with each other;
- a transmission ring body rotatably secured to said eccentric shaft portion within said stationary ring and said rotational ring so as to implement an eccentric rotation combined with a rotational movement and a revolving movement when said shaft is rotated;
- a transmission ring gear provided to have outer teeth circumferentially formed continuously at one peripheral side of said transmission ring body with said outer teeth profiled along a trochoidal curve, some of said outer teeth always engaging with a plurality of said pin rollers of said array of transmission pin rollers;
- an integral difference represented in number between number of the pin rollers of said array of transmission pin rollers and number of said teeth of said transmission ring gear; and
- an adjustment mechanism provided between the other peripheral side of said transmission ring body and an open end side of said rotational ring in order to take out only said rotational movement from said eccentric rotation of said transmission ring body to transmit said rotational movement to said rotational ring when operated.

10. A roller type transmission device in which a housing is provided to rotatably accommodate a shaft which has an eccentric shaft portion, and a stationary ring has a predetermined width, and provided within said housing in concentric relationship with said shaft, comprising:
- a rotational body fixedly placed within said housing in concentric relationship with said shaft, and having an open-ended portion which fixedly places a rotational ring in concentric relationship with said stationary ring;
- an array of transmission pin rollers having a predetermined number of pin rollers which are press fit along a certain basic circle into said stationary ring to be in line contact with an inner side surface of said stationary ring with the abutting pin rollers pressure exerted circularly in line contact with each other;
- a transmission ring body rotatably secured to said eccentric shaft portion between said stationary ring and said rotational body so as to implement an eccentric rotation combined with rotational and revolving movement when said shaft is rotated;
- a transmission ring gear provided to have outer teeth circumferentially formed continuously at one peripheral side of said transmission ring body with said outer teeth profiled along a trochoidal curve, some of said outer teeth always engaging with a plurality of said pin rollers of said array of transmission pin rollers;
- an integral difference represented in number between number of said pin rollers of said array of transmission pin rollers and number of said teeth of said transmission ring gear; and
- an adjustment mechanism provided between an outer peripheral side of said transmission ring body and an open end side of said rotational ring in order to take out only said rotational movement from said eccentric rotation of said transmission ring body to transmit said rotational movement to said rotational ring when operated.

11. The roller type transmission device according to claim 9 or 10, wherein said adjustment mechanism has a plurality of circular cavities provided on one of an outer peripheral side of said transmission ring body and an open end side of said rotational ring along a predetermined circle, and pins are provided on the other of said outer peripheral side of said transmission ring body and an open end side of said rotational ring, a diametrical dimension of said circular cavity being equal to a two-fold of an eccentricity of said eccentric shaft portion plus a diametrical dimension of said pin, so that said pins come in sliding contact with circumferential wall surfaces of said cavities when operated.

12. The roller type transmission device according to claim 9 or 10, wherein said adjustment mechanism forms Oldham's shaft coupling comprising:
- an adjustment plate provided between an outer peripheral side of said transmission ring body and an open end side of said rotational ring, one side surface of said adjustment plate having a first radial blade and the other side surface of said adjustment plate having a second radial blade in crossing relationship with said first radial blade;
- a first streak of radial groove provided on said outer peripheral side of said transmission ring body to slidably receive said first radial blade; and
- a second streak of radial groove provided on an open end side of said rotational ring to slidably receive said second radial blade.

* * * * *